J. B. FISCHER.
VEHICLE TIRE.
APPLICATION FILED OCT. 14, 1910.
1,000,165.
Patented Aug. 8, 1911.
2 SHEETS—SHEET 1.
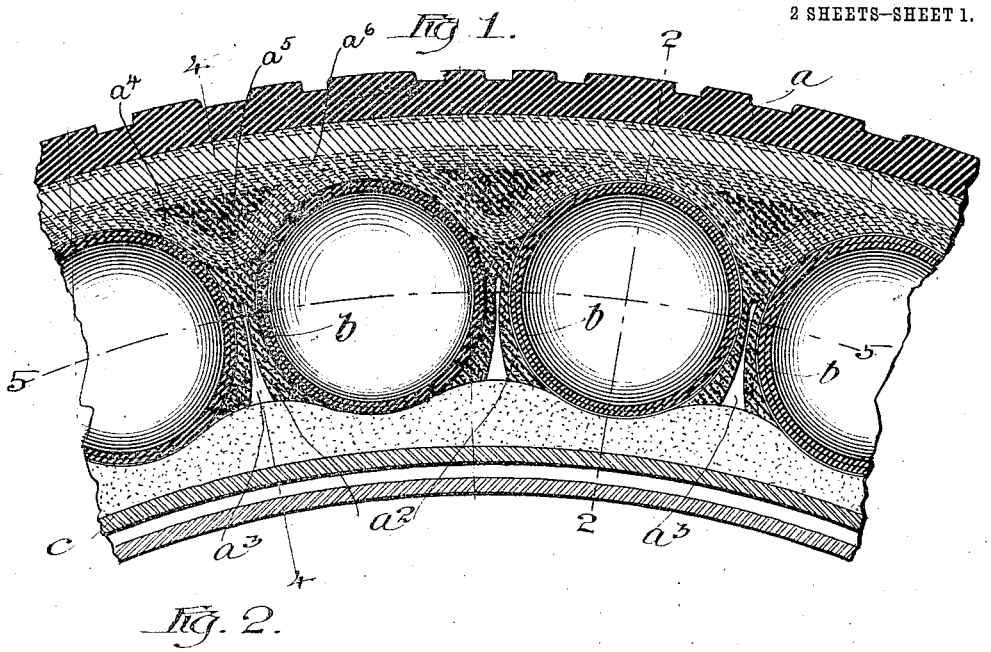
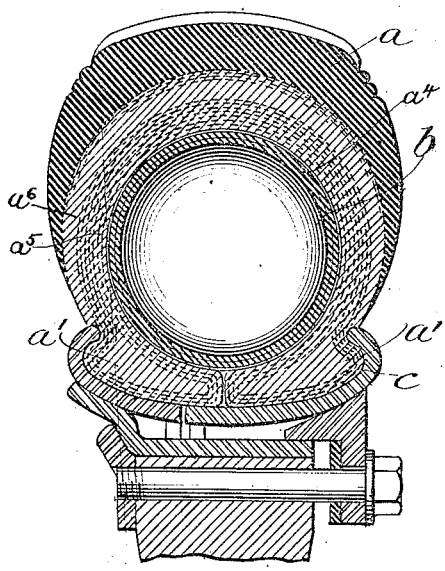
Witnesses:
Frank J. Blanchard
R. A. Dwight
Inventor:
John B. Fischer,
By Cheever & Cox.
Attorneys.

J. B. FISCHER.
VEHICLE TIRE.
APPLICATION FILED OCT. 14, 1910.

1,000,165.

Patented Aug. 8, 1911.

2 SHEETS—SHEET 2.

Witnesses:
Frank B. Blanchard
R. D. Dwight

Inventor:
John B. Fischer.
By Cheever & Cox
Attorneys.

UNITED STATES PATENT OFFICE.

JOHN B. FISCHER, OF CHICAGO, ILLINOIS.

VEHICLE-TIRE.

1,000,165.  Specification of Letters Patent.  Patented Aug. 8, 1911.

Application filed October 14, 1910. Serial No. 587,030.

*To all whom it may concern:*

Be it known that I, JOHN B. FISCHER, a citizen of the United States, residing at Chicago, in the county of Cook and State of Illinois, have invented a certain new and useful Improvement in Vehicle-Tires, of which the following is a specification.

This invention relates to vehicle tires of the hollow resilient or rubber tube type, such as are used for automobiles, and has for its object to provide an improved construction of resilient case tube or tire which shall be simple, easy riding and durable, also readily accessible for repairs.

Figure 3:
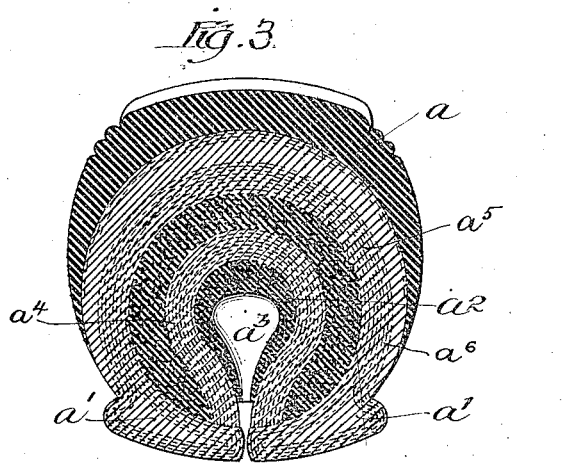
Figure 4:
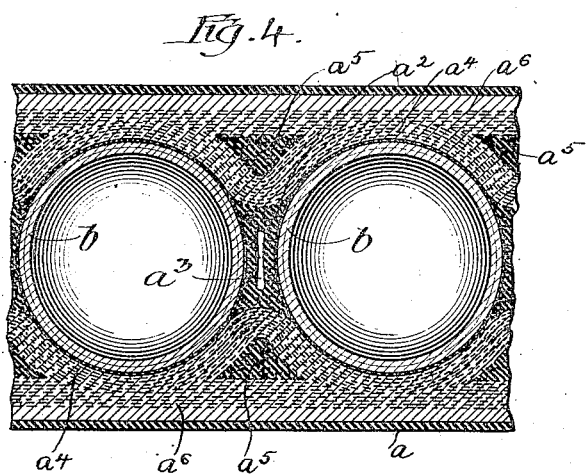

In the accompanying drawings: Figure 1 is a sectional view of the tire, showing a portion of the length thereof; Fig. 2, a transverse section taken on the line 2—2 of Fig. 1; Fig. 3, a transverse section taken on the line 4—4 of Fig. 1; and Fig. 4, a sectional view taken on the line 5—5 of Fig. 1.

According to my improved construction, the case tube or tire is formed with a plurality or series of cavities, preferably rounded or spherical in shape, located within the tube around the circumference and separated by intermediate walls or spacers $a^2$. The tube containing these cavities may be constructed by taking a plurality of layers $a^4$, of fabric and rubber applied to a mold or form to give the desired corrugated or rounded shape for the cavities. In the depressions between the corrugations are located the triangular or crescent shaped pieces $a^5$, of what is known as cushion stock, which may be inclosed in a covering of several layers of fabric and rubber, and over all additional layers $a^6$, of fabric and rubber are then applied, making a substantially smooth external appearance with the two lips or flanges $a'$, $a'$, at the inner periphery. The exterior of the tire or casing $a$ is then finished by adding sufficient cushion stock and other material to form the wearing surface or tread of the tire. As shown in Figs. 2 and 3, this tube is of the split "clencher" type, the flanges $a'$, $a'$ being held and clamped together by the rim $c$ of the wheel. Within the tube the spherical cavities are completed by inserting the spacers $a^2$ which may be formed of cushion stock and have recesses $a^3$ open toward the inner periphery. These spacers or walls are placed transversely of the tube, and secured at the points of depression of the corrugations of the inner tube with which they form complete rounded or spherical cavities spaced apart throughout the tube.

The resilient crescent shaped pieces $a^5$ which are formed of rubber cushion stock, constitute substantially an extension of the resilient transverse walls or spacing pieces $a^2$ into the fabric in the inner portion of the tube so that whenever the tire engages an obstruction at this point, the pressure is transmitted through the yielding and resilient crescent shaped piece to the upper part of the ball and also through the spacing pieces to the sides and lower portion of the ball giving a more uniform pressure throughout.

Resilient or rubber balls $b$ may, if desired, be inserted in the spherical cavities where they will be securely held by the walls of the spacing pieces.

In operation, to remove or introduce a ball, the casing will be detached for a convenient portion of its length and the flanges $a'$ and lower portions of the spacers $a^2$ will be spread apart to the extent required. After a ball has been thus introduced and the casing parts released, the ball will be completely enveloped in the casing, and by it securely held in place. On account of the location of the balls it will be difficult for a puncturing object to reach them but in case one is actually punctured it alone will become deflated, and only a very small portion of the tire is affected. Indeed under ordinary circumstances the tire will not be put out of commission and may be used either with or without the resilient balls located in the cavities.

It will be noted that with my construction there is no special internal pressure upon the casing as in the case of an inner tube or ordinary single tube tire and, therefore, the danger of "blow outs" is avoided.

Having now described my invention, what I claim as new and desire to secure by Letters Patent, is:—

1. A resilient vehicle tire comprising a case tube having its inner portion formed with rounded corrugations, and transverse spacing pieces located at the depression points of the corrugations and forming therewith rounded cavities spaced apart throughout the tire.

2. A resilient vehicle tire comprising a case tube having its inner portion formed with corrugations, crescent shaped pieces of yielding rubber material incased within the fabric at the depression points of the corrugations, and spacing pieces constituting transverse walls inside the tube opposite the crescent shaped pieces, thereby forming cavities spaced apart throughout the tire.

3. A resilient vehicle tire comprising a case tube formed with corrugations upon its inner portion and split at its inner periphery, resilient walls closing the interior of the tube at the depression points to form a series of rounded cavities spaced apart, and resilient balls located in said cavities.

4. A resilient vehicle tire comprising a case tube formed with corrugations upon its inner portion and split at its inner periphery, resilient walls having recesses open at the inner side and forming with the corrugations a series of rounded cavities, and resilient balls located in said cavities.

In witness whereof, I have hereunto subscribed my name in the presence of two witnesses.

JOHN B. FISCHER.

Witnesses:
HOWARD M. COX,
MARGARET D. ROBB.